Figure 1:
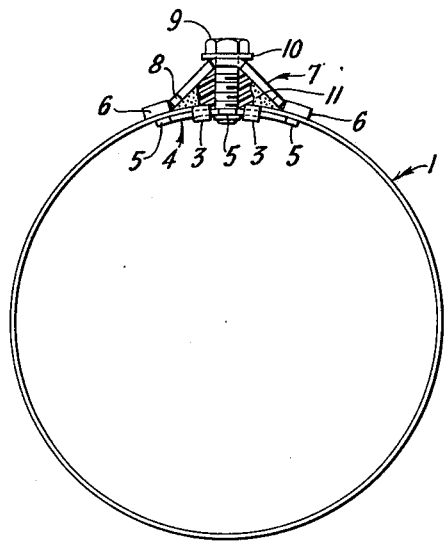

July 21, 1964  G. BROBERG ETAL  3,141,687
DUCT COUPLING FOR JOINING DUCTS
Filed Nov. 7, 1960

INVENTORS.
GEORG BROBERG
BROR JOHANSSON
SVEN WALLIN
BY Howson & Howson
ATTYS.

United States Patent Office 3,141,687
Patented July 21, 1964

3,141,687
DUCT COUPLING FOR JOINING DUCTS
Georg Broberg, Solna, and Bror Johansson and Sven Wallin, Jonkoping, Sweden, assignors to Aktiebolaget Svenska Flaktfabriken, Stockholm, Sweden
Filed Nov. 7, 1960, Ser. No. 67,738
3 Claims. (Cl. 285—397)

The present invention relates to a device for joining pipes or pipe fittings, preferably thin-walled pipe sections to be used in ventilating systems, and of the type comprising a splicing strap and a tensioning device cooperating therewith. Present-day building methods involve increased strength-requirements as regards the ventilating piping and its junctions, especially when they are to be cast into concrete. Conventional joining methods of using an external wrapping as the joining element, according to prior practice, have been found not to afford sufficiently rigid and tight junctions. In addition, such prior joining methods tend to produce forces directed towards the axis of the pipe and which have frequently involved the danger of buckling the pipe-walls inwardly. The above-mentioned requirement for rigidity has been enforced by the employment of so-called spiralized pipes. However, it has been found that it is difficult to obtain sufficient tightness at the externally disposed overlapping seam which stands out relatively high.

The invention has for its object to overcome the inconvenience referred to above by simple means and is mainly characterised in that the splicing strap used is constituted by one or more arcuate elements insertable into the two adjacent ends of the pipe sections to be connected and adapted to be expanded circumferentially by means of said tensioning device, which is actuatable externally of the joint to expand the strap forcefully into engagement with the inner wall surfaces of the aligned ends of the pipes. According to a preferred embodiment of the invention, the arcuate elements of the splicing strap are constituted by steel bands the adjacent ends of which are movably interconnected by a plate member disposed interiorly of the band ends. The tensioning device is suitably in the form of an angularly bent resilient plate or any other toggle-like element provided at its lateral edges parallel to the axis of the pipes with legs projecting inwardly between the pipe ends and engaging lugs or recesses associated with the arcuate elements of the splicing strap, said toggle plate being adapted, by means of a screw threaded through the plate interconnecting the arcuate elements, to be forced inwardly towards said strap so as to be flattened, thereby acting as a toggle joint in separating the adjacent free ends of the elements. The interconnecting plate which is intended to retain the arcuate elements in their associated relationship is suitably held in place relative to these elements by means of tongues cut out in the end portions of the latter and bent over about the edges of the interconnecting plate, and by said plate being provided at said edges with stop abutments cooperating with said tongues, such abutments being provided midway between the two ends of said edges as well as at said two ends and serving, on the one hand, to predetermine a minimum separation between the adjacent free ends of the arcuate elements corresponding, at least, to the diameter of the screw threaded through said plate, and, on the other hand, to prevent any disengagement of the arcuate elements from the interconnecting plate. Where the demands for tightness are particularly great, a sealing gasket of elastic material is suitably placed beneath the toggle plate of the tensioning device.

Figure 3:
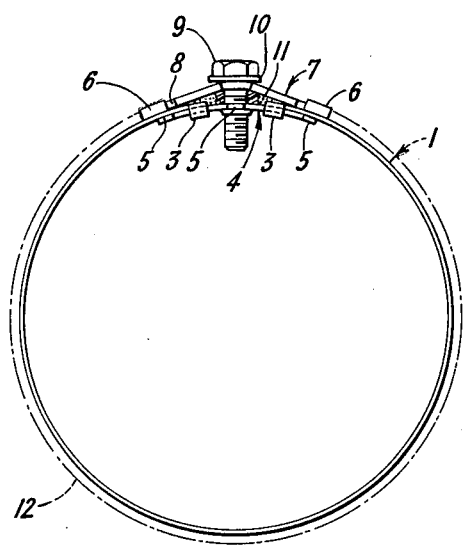
Figure 2:
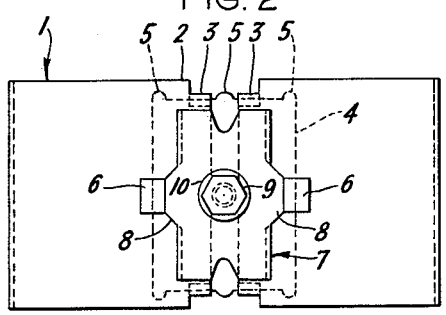
Figure 4:
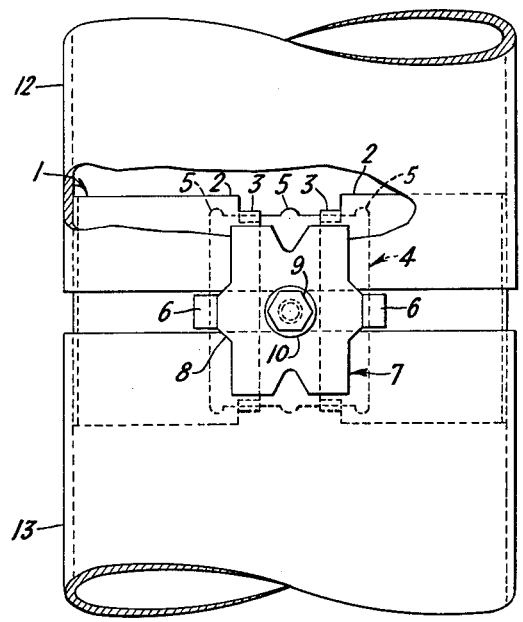

The invention will now be described more closely in conjunction with the accompanying drawing illustrating by way of example one form of the pipe joint embodying the invention, and in which:

FIGS. 1 and 2 illustrate the pipe joint per se in end view and side view, respectively, prior to assembly; and
FIGS. 3 and 4 illustrate the pipe joint in situ after assembly and in views similar to those of FIGS. 1 and 2, respectively.

In the drawing, numeral 1 designates a splicing strap which, in the embodiment shown, is in the form of a steel band having its end portions 2 formed with bent-over tongues 3 embracing and engaging the edges of an internally disposed plate 4 by which the adjacent aligned ends of the steel band are movably interconnected. The splicing strap is intended to be inserted into the two adjacent ends of two pipe sections 12 and 13, respectively. Numeral 7 designates an angularly bent resilient, toggle-shaped plate slidably engaging the external surface of the pipe ends. The lateral edges of the toggle plate parallel to the longitudinal axis of the pipe sections are formed with legs 8, respectively, projecting inwardly between the pipe ends. These legs at their ends engage abutments 6 provided on the steel band. Said toggle plate 7 is adapted, by means of a screw 9 threadedly engaging the plate 4 interconnecting the two ends of the steel band 1, to be forced inward towards the steel band and thus to be flattened thereby acting in the manner of a toggle joint in separating the free ends of the steel band—as specifically shown in FIG. 3. The interconnecting plate 4 is provided at the edges thereof embraced by the tongues 3 with stop abutments 5 for cooperation with said tongues and disposed midway between the ends of said edges of the plate as well as at these ends. This arrangement has for its purpose, on the one hand, to establish a minimum separation of the free ends of the steel band corresponding, at least, to the diameter of the screw 9 threaded through the interconnecting plate 4, and on the other hand, to prevent any disengagement of the ends of the steel band from this plate. Numeral 10 designates a washer inserted between the screw head and the toggle plate 7. Numeral 11 denotes a sealing gasket or elastic material disposed beneath the angularly bent plate 7 of the tensioning device.

What we claim is:
1. A device for joining duct ends together comprising in combination with two adjacent duct ends to be joined, an axially split circumferential splicing strap disposed inside the duct ends to be joined, reaction spreader elements provided on said strap and spaced from said split ends, a first curved joint plate engaging one side of said strap adjacent the ends, a bowed deformable second joint plate engaging the other side of said strap adjacent the ends, said bowed plate member having spreader elements engaging said reaction spreader elements on said strap, means radially engaging said plates to urge them together and reduce the bend in said bowed plate to force the band ends apart and tighten the band in the duct ends, and stop means between said first plate and said strap for limiting the circumferential spreading movement of said strap.

2. A device for joining duct ends together comprising in combination with two adjacent duct ends to be joined, an axially split circumferential splicing strap disposed inside the duct ends to be joined, reaction spreader elements provided on said strap and spaced from said split ends, a first curved joint plate engaging one side of said strap adjacent the ends, a bowed deformable second joint plate engaging the other side of said strap adjacent the ends, said bowed plate member having spreader elements engaging said reaction spreader elements on said strap, means radially engaging said plates to urge them together and reduce the bend in said bowed plate to force the band ends apart and tighten the band in the duct ends, and bent edge-embracing elements on one of said plate and strap parts and projections on the other one of said parts engageable with said bent elements to provide stops for limiting circumferential spreading movement of said strap.

3. A device for joining duct ends together, comprising in combination with adjacent spaced apart duct ends to be joined, an axially split circumferential splicing strap disposed inside the duct ends and overlying the ends of both ducts, reaction spreader elements provided on said strap and spaced from said split ends, said reaction elements on said strap being disposed between the adjacent duct ends, a curved first joint plate overlying the inner surface of the adjacent ends of said split strap, guide and stop means between the sides of said strap and said first plate, an outwardly bowed deformable second joint plate overlying the adjacent ends of said ducts and having spreader elements engaging said reaction spreader elements on said strap between the ends of said ducts, and screw clamp means between said plates for urging them together and for reducing the bowed shape of said second plate to force the ends of said strap apart and tighten it in the ducts.

References Cited in the file of this patent

UNITED STATES PATENTS

| | | |
|---|---|---|
| 115,906 | Stine | June 13, 1871 |
| 2,462,721 | Cohen | Feb. 22, 1949 |
| 2,555,378 | Shuter | June 5, 1951 |
| 2,684,221 | Wollam | July 20, 1954 |
| 2,846,243 | Jewell | Aug. 5, 1958 |